(12) United States Patent
Chen et al.

(10) Patent No.: US 10,473,129 B2
(45) Date of Patent: Nov. 12, 2019

(54) ENERGY-SAVING HYDRAULIC SYSTEM

(71) Applicants: Wen-Chieh Chen, Taipei (TW);
Shu-Hui Tseng, Taipei (TW)

(72) Inventors: Wen-Chieh Chen, Taipei (TW);
Shu-Hui Tseng, Taipei (TW);
Chun-Chung Chen, Taipei (TW)

(73) Assignees: Wen-Chieh Chen, Taipei (TW);
Shu-Hui Tseng, Taipei (TW)

( * ) Notice: Subject to any disclaimer, the term of this patent is extended or adjusted under 35 U.S.C. 154(b) by 10 days.

(21) Appl. No.: 15/741,559

(22) PCT Filed: Jun. 12, 2016

(86) PCT No.: PCT/IB2016/000809
§ 371 (c)(1),
(2) Date: Jan. 3, 2018

(87) PCT Pub. No.: WO2017/013481
PCT Pub. Date: Jan. 26, 2017

(65) Prior Publication Data
US 2018/0195538 A1 Jul. 12, 2018

(30) Foreign Application Priority Data
Jul. 17, 2015 (TW) .............................. 104123224 A

(51) Int. Cl.
*F15B 21/14* (2006.01)
*F03G 3/04* (2006.01)
*B66F 7/16* (2006.01)

(52) U.S. Cl.
CPC ................ *F15B 21/14* (2013.01); *F03G 3/04* (2013.01); *B66F 7/16* (2013.01)

(58) Field of Classification Search
CPC .. F15B 21/14; F03B 13/26; F03G 3/04; B66F 7/16
See application file for complete search history.

(56) References Cited

U.S. PATENT DOCUMENTS 3,487,228 A * 12/1969 Bernard ................ F03B 13/187
290/52
3,515,889 A * 6/1970 Kammerer ............ F03B 13/187
290/53

(Continued)

*Primary Examiner* — Mark A Laurenzi
*Assistant Examiner* — Shafiq Mian
(74) *Attorney, Agent, or Firm* — Li & Cai Intellectual Property (USA) Office

(57) ABSTRACT

An energy-saving hydraulic system includes an exerting hydraulic device, a buffering receptacle arranged at one side of the exerting hydraulic device, an impetus hydraulic device connecting to the exerting hydraulic device, and a recovering hydraulic device. The exerting hydraulic device has a loading receptacle selectively disposed at a first high position and a first low position. The impetus hydraulic device has a transferring receptacle selectively disposed at a second high position, a recovering position, and a second low position. The second low position is lower than the buffering receptacle. The recovering hydraulic device connects the exerting hydraulic device and the impetus hydraulic device, and includes a sustaining portion. When the impetus hydraulic device is lowering to the second low position, it contacts the sustaining portion of the recovering hydraulic device to push working liquid to flow back the exerting hydraulic device from the recovering hydraulic device.

10 Claims, 11 Drawing Sheets

(56) References Cited

U.S. PATENT DOCUMENTS

| | | | |
|---|---|---|---|
| 6,445,078 B1* | 9/2002 | Cieslak, Jr. | F03B 13/262 290/42 |
| 2012/0019004 A1* | 1/2012 | Ekern | F03B 13/06 290/53 |
| 2012/0204563 A1* | 8/2012 | Fiske | F03G 3/00 60/639 |

* cited by examiner

ENERGY-SAVING HYDRAULIC SYSTEM

BACKGROUND OF THE INVENTION

1. Field of the Invention

The present invention is related to an energy-saving hydraulic system, particularly to a hydraulic system that uses a potential difference of working material to drive a plurality of hydraulic devices, and conveys another working material upward, wherein some working material falls to the original position, so to achieve the energy-saving effect of circulating usage.

2. Description of Related Art

The conventional hydraulic system usually needs an additional power source, so as to help to raise an object, and make a working fluid (such as hydraulic oil) to flow back. Thus, it still has something needed to be improved.

Further, the earth's resources are very limited, and more and more people care about energy conservation and replacement of resources in an environmental manner, such as solar energy, hydroelectric power, wind-driven power generation . . . etc. However, the above environmental resources are very limited by their respective environments, which may not be provided stably. For example, solar energy cannot be provided at night; hydroelectric power is not generated without water; and wind-driven power is very easily affected by unstable wind.

Therefore, how to economize the use of resources in an environmentally-friendly manner is very crucial.

SUMMARY OF THE INVENTION

An objective of the present invention is to provide an energy-saving hydraulic system using resources economically in an environmentally-friendly manner, especially a manner of transforming a potential energy to a kinetic energy, to achieve the objective of energy conservation and environmental protection.

To achieve the above-mentioned objectives, the present invention provides an energy-saving hydraulic system, which includes an exerting hydraulic device, a buffering receptacle, an impetus hydraulic device, and a recovering hydraulic device. The exerting hydraulic device includes a loading receptacle. The loading receptacle is selectively arranged in a first high position, or a first low position. The buffering receptacle is arranged at one side of the exerting hydraulic device, and is fixed in a position lower than the first low position. The impetus hydraulic device is connected to the exerting hydraulic device by a first pipe. The impetus hydraulic device has a transferring receptacle. The transferring receptacle is selectively arranged in a second high position, a returning position, or a second low position lower than the returning position. When the loading receptacle is lowered to the first low position, a working fluid in the exerting hydraulic device flows to the impetus hydraulic device, so as to lift the transferring receptacle to the second high position. The recovering hydraulic device is connected to the impetus hydraulic device by a second pipe, and connected to the exerting hydraulic device by having a third pipe. When the transferring receptacle of the impetus hydraulic device is lowered from the second high position to the returning position, the transferring receptacle contacts the sustaining portion. When the transferring receptacle is continuously lowered to the second low position, the transferring receptacle presses the sustaining portion to urge the working fluid to flow from the recovering hydraulic device back to the exerting hydraulic device.

Based on the above, the present invention has at least the following advantages. The loading receptacle in the first high position is higher than the buffering receptacle, and the buffering receptacle is higher than the transferring receptacle of the impetus hydraulic device in the second low position. The present invention utilizes the potential difference of the working material to drive the hydraulic device, and the potential energy of the working material is transformed into a kinetic energy. The working material can even be moved back to the loading receptacle, so as to achieve the effectiveness of energy conservation and environmental protection.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

First Embodiment

Figure 1:
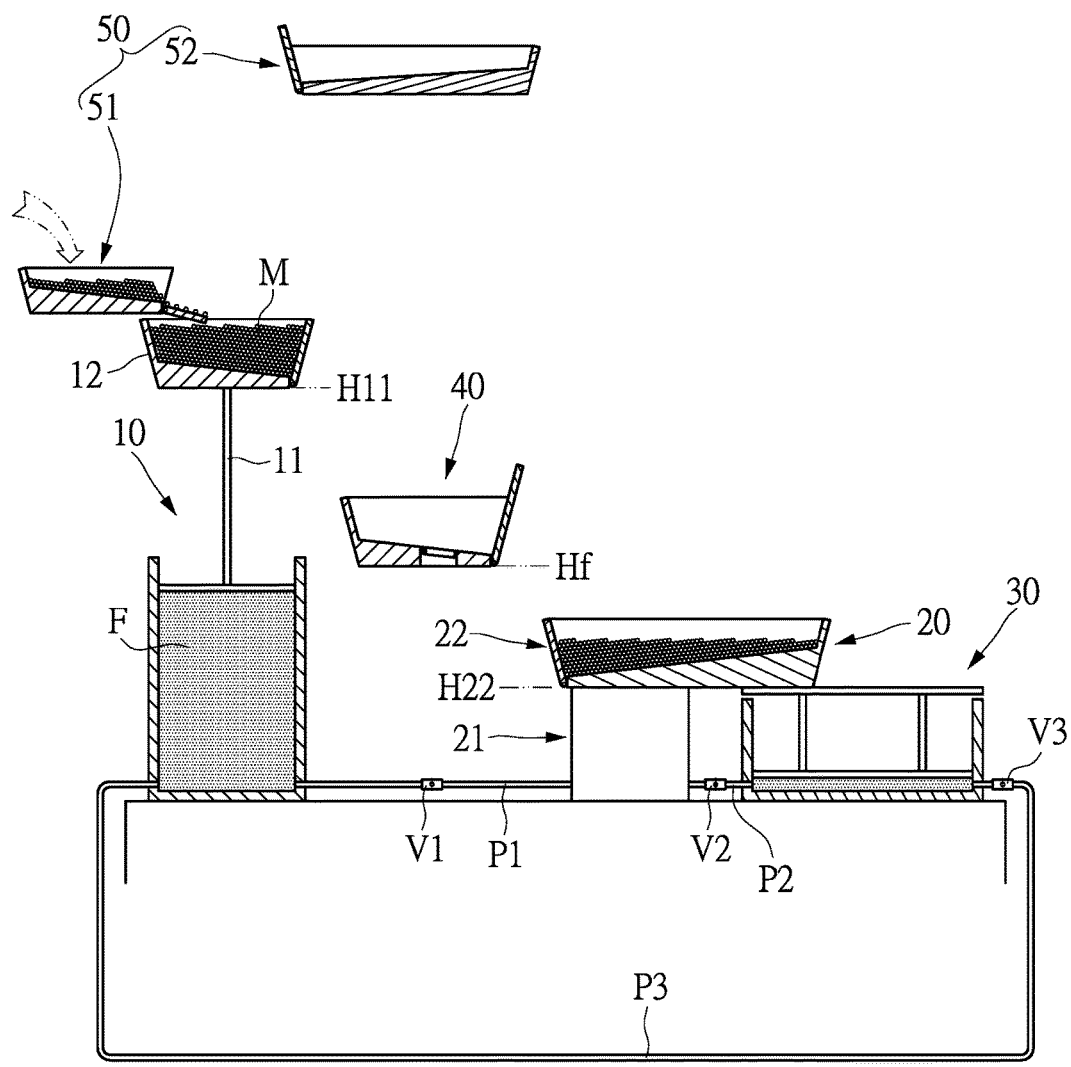
FIG. 1 is a schematic view of an energy-saving hydraulic system in an initial condition of the present invention.
Figure 2:
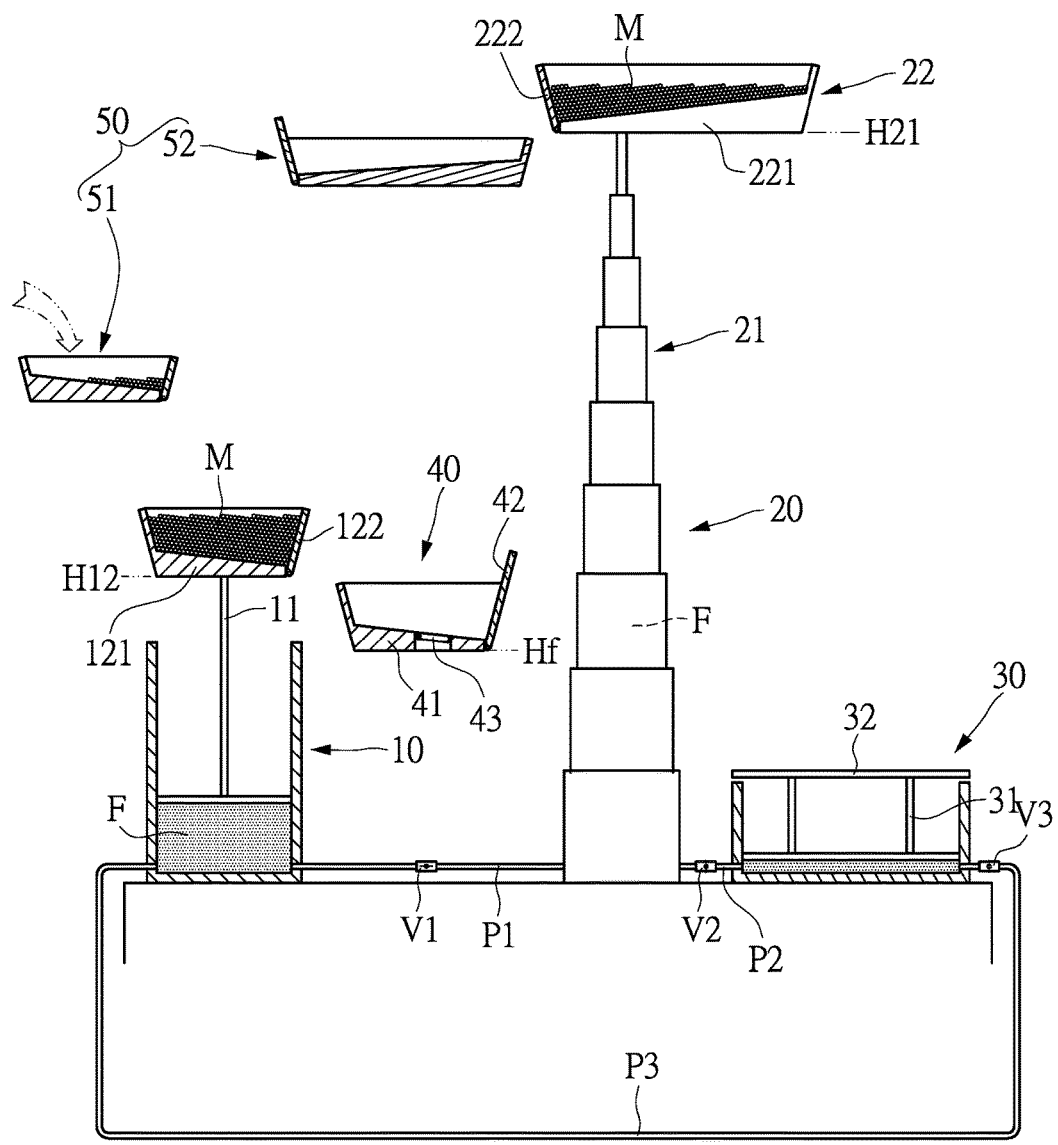
FIG. 2 is a schematic view of an energy-saving hydraulic system lifting a transferring receptacle of the present invention.

Reference is made to FIG. 1 and FIG. 2, which are perspective views of the energy-saving hydraulic system of the present disclosure. First, elements of the energy-saving hydraulic system are introduced, and then an operating manner of the energy-saving hydraulic system is introduced.

The energy-saving hydraulic system of the present disclosure includes an exerting hydraulic device 10, an impetus hydraulic device 20, a recovering hydraulic device 30, a buffering receptacle 40 disposed at one side of the exerting hydraulic device 10, and a secondary circulation device 50. The secondary circulation device 50 includes a temporal-retaining high trough 52.

The exerting hydraulic device 10 includes a first piston 11, and a loading receptacle 12 arranged at a top end of the first piston 11. The loading receptacle 12 can be raised up or lowered down by the first piston 11. The first piston 11 can raise the loading receptacle 12 to a first high position H11 (as shown in FIG. 1), or lower the loading receptacle 12 to a first low position H12 (as shown in FIG. 2). In this embodiment, the first high position H11 can be the highest position that the loading receptacle 12 can be raised to by the first piston 11. The first low position H12 can be the lowest position of the loading receptacle 12 can be lowered down to by the first piston 11.

Refer to FIG. 1. The present disclosure has a material-retaining temporal trough 51 for receiving working material M, such as mineral from a mining area . . . etc. The position of the material-retaining temporal trough 51 is arranged to be higher than the position of the first high position H11. When the loading receptacle 12 is located at the first high position H11, it is close to the material-retaining temporal trough 51. In other words, the material-retaining temporal trough 51 is higher than the loading receptacle 12 at the first high position H11, so that the working material M can be transferred into the loading receptacle 12 from the material-retaining temporal trough 51 by gravity. As shown in FIG. 2, the material-retaining temporal trough 51 pushes the working material M to the loading receptacle 12. The material-retaining temporal trough 51 preferably has a sensor to control a total weight of the working material M entering the loading receptacle 12. Through the weight difference, the working material M in the loading receptacle 12 can be controlled to be more than the working material M in the transferring receptacle 22.

The impetus hydraulic device 20 is connected to the exerting hydraulic device 10 by a first pipe P1, and the first pipe P1 can have at least one control valve V1. In this embodiment, the impetus hydraulic device 20 is a retractable-type hydraulic device. The impetus hydraulic device 20 includes a second piston 21, and a transferring receptacle 22 arranged at a top end of the second piston 21. The transferring receptacle 22 is selectively raised in a second high position H21 (as shown FIG. 2), a returning position H23 (as shown FIG. 7), and a second low position H22 (as shown FIG. 1) lower than the returning position H23. In this present embodiment, the second high position H21 can be the highest position of the transferring receptacle 22 lifted by the second piston 21. The second low position H22 can be the lowest position of the transferring receptacle 22 lowered by the second piston 21. In this embodiment, a height of the second low position H22 is lower than a height of the buffering receptacle 40. The second high position H21 is higher than the first high position H11.

The buffering receptacle 40 is arranged at one side of the exerting hydraulic device 10, and is fixed in a position lower than the first low position H12, which can refer to the buffer position Hf as shown in FIG. 1. Meanwhile, the buffering receptacle 40 is also disposed between the exerting hydraulic device 10 and the impetus hydraulic device 20 to temporarily receive the working material M from the loading receptacle 12 of the exerting hydraulic device 10, and transfer the working material M to the transferring receptacle 22 of the impetus hydraulic device 20 at the proper time.

Refer to FIG. 2. The present disclosure utilizes the gravity force. The buffering receptacle 40 includes a slanted bottom-surface 41, an active gate 42, and a bottom gate 43. The loading receptacle 12 has a slanted bottom-surface 121 inclined to the buffering receptacle 40, and an active gate 122 which faces the buffering receptacle 40. The transferring receptacle 22 includes a slanted bottom-surface 221 and an active gate 222.

The recovering hydraulic device 30 includes a third piston 31, and a sustaining portion 32 connected to the third piston 31 which can be raised or lowered. The recovering hydraulic device 30 is connected to the impetus hydraulic device 20 by a second pipe P2, and is connected to the exerting hydraulic device 10 by a third pipe P3. The recovering hydraulic device 30 is used to temporarily hold the working fluid F, and transfer it back to the exerting hydraulic device 10 at the proper time, which is detailed following. The second pipe P2 is equipped with at least one control valve V2. The third pipe P3 is equipped with a control valve V3.

The operation manner of the energy-saving hydraulic system is detailed as follows. Refer to FIG. 1, before the working material M is entered into the loading receptacle 12 of the exerting hydraulic device 10, firstly turn off the control valve V1 of the first pipe P1 and the control valve V3 of the third pipe P3 (alternatively, the control valve V3 can be a unidirectional value). The working material M preferably is solid form, or any material that can be transferred from a lower position to a higher position.

Refer to FIG. 2. After the working material M has been filled in the loading receptacle 12, turn on the control valve V1. The first piston 11 of the exerting hydraulic device 10 is lowered by gravity and the working fluid F is squeezed in to the impetus hydraulic device 20 through the first pipe P1. When the loading receptacle 12 of the exerting hydraulic device 10 is lowering, the potential energy is changed and transferred to the impetus hydraulic device 20 by the hydraulic device. The second piston 21 of the impetus hydraulic device 20 lifts the transferring receptacle 22 up to the second high position H21. The working material M in the transferring receptacle 22 can be lifted or transferred to a next station according to the actual requirements. One practical embodiment of the working material M is mineral extracted from a mountain, which usually is exited in a higher position. This embodiment utilizes a potential difference (changed height) of the working material M in the loading receptacle 12 during a lowering process, to lift the working material M in the transferring receptacle 22, and further can transfer the working material M to a higher position.

A supplementary note is that, in this embodiment to arrange a height of the transferring receptacle 22 higher than a height of the loading receptacle 12, the total weight of lifted mechanism, such as the loading receptacle 12 and the first piston 11, and the working material M in the loading receptacle 12 is larger than the total weight of the lifted mechanism, such as the transferring receptacle 22 and the second piston 21, and the working material M of the transferring receptacle 22.

Figure 3:
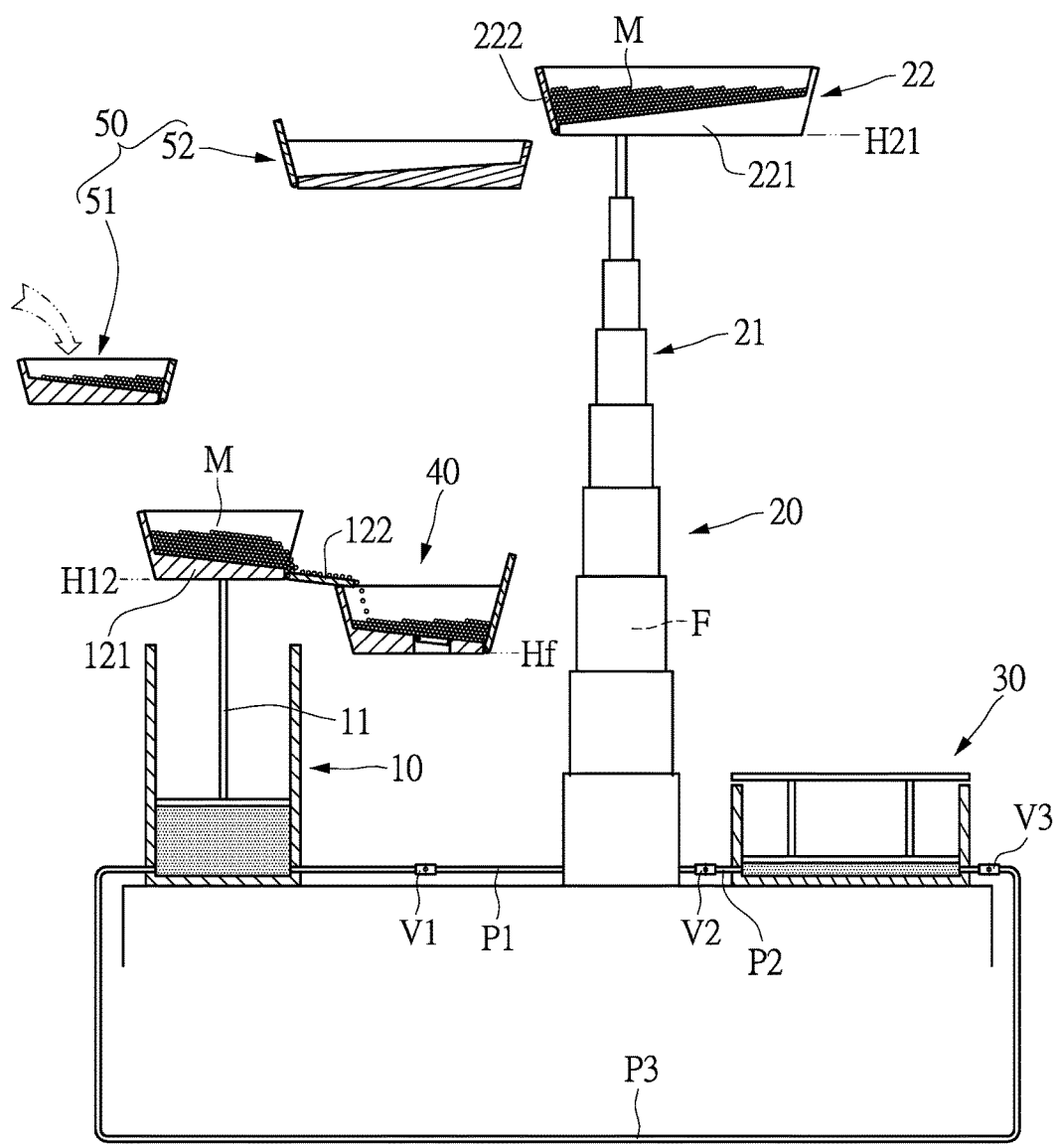
FIG. 3 is a schematic view of an energy-saving hydraulic system transferring a working material to a buffering receptacle of the present invention.

Refer to FIG. 3. During the lifting of the transferring receptacle 22, the control valve V2 is turned off. The working material M in the loading receptacle 12 can be transferred to the buffering receptacle 40. During the transferring of the working material M, the control valve V1 is turned off. Alternatively, the control valve V1 can be a check valve, or one-way valve for prevent the working liquid from flowing back, so as to empty the loading receptacle 12.

Figure 4:
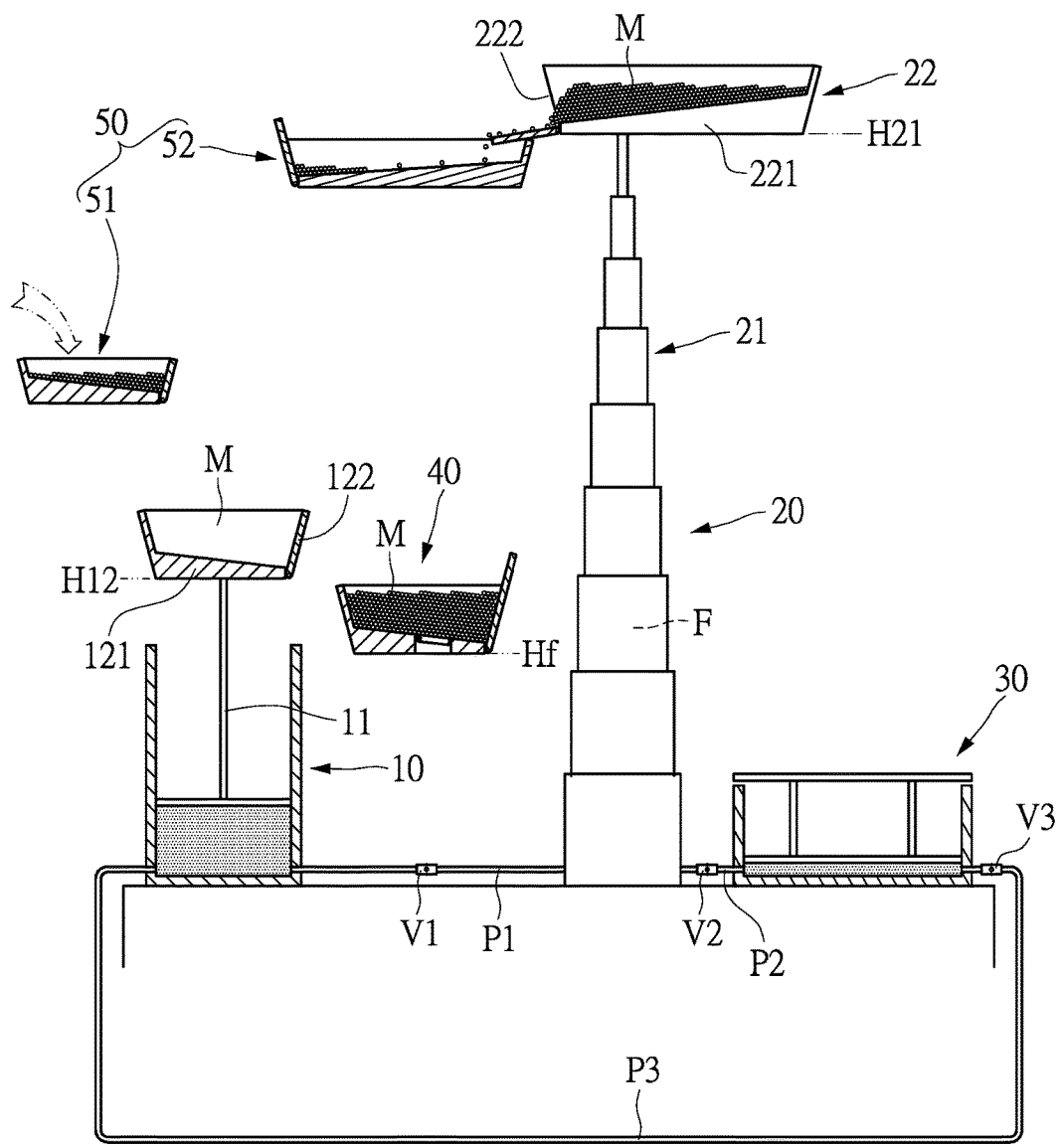
FIG. 4 is a schematic view of an energy-saving hydraulic system transferring the working material to a temporal-retaining high trough of the present invention.
Figure 5:
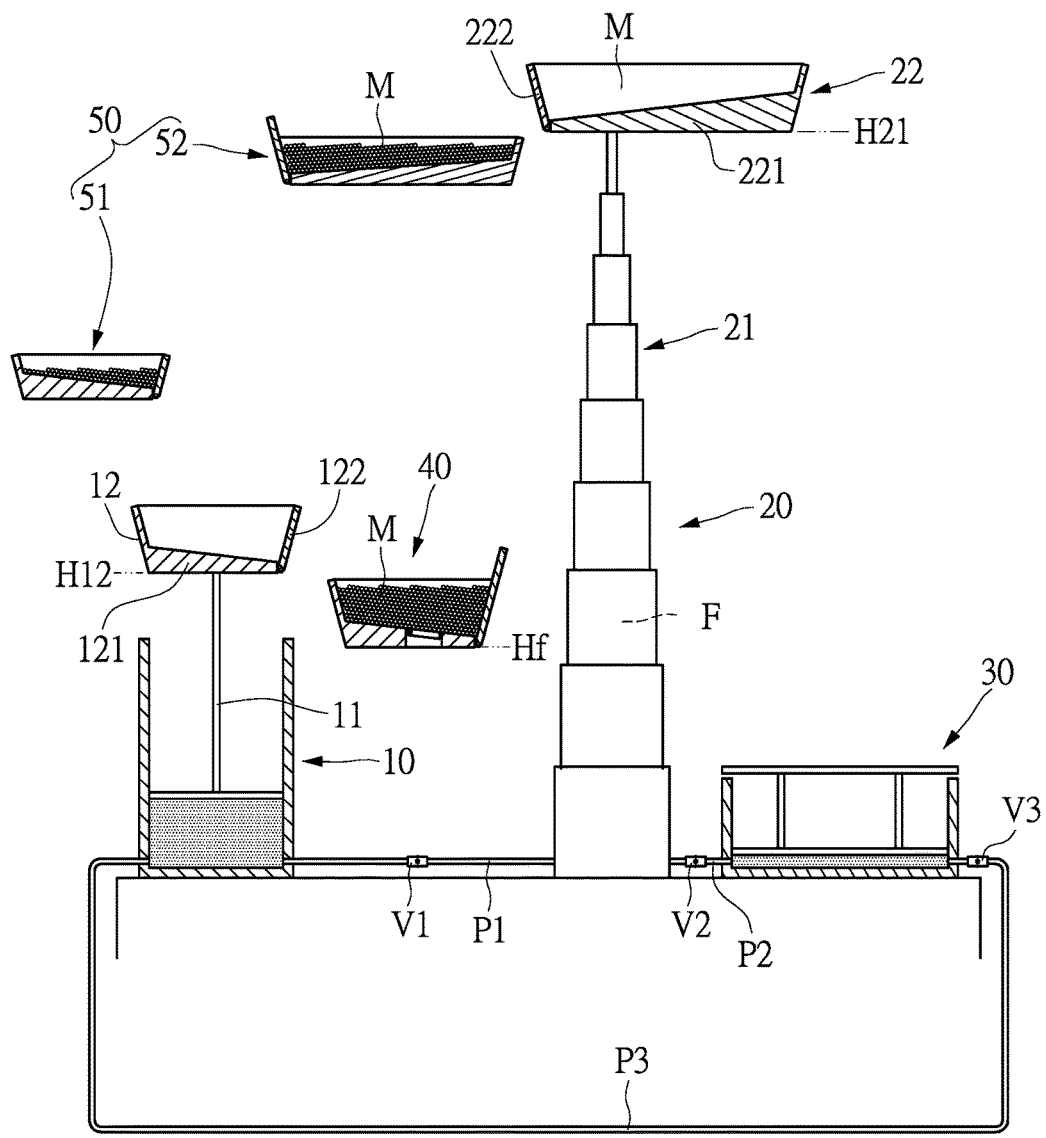
FIG. 5 is a schematic view of an energy-saving hydraulic system having the working material disposed in the buffering receptacle and the temporal-retaining high trough of the present invention.

As shown in FIG. 4, in this embodiment, the temporal-retaining high trough 52 is fixed in a position lower than the second high position H21. When the transferring receptacle 22 is moved to the second high position H21, the temporal-retaining high trough 52 is close to the transferring receptacle 22. The working material M in the transferring receptacle 22 can be transferred to the temporal-retaining high trough 52 of the secondary circulation device 50, so as to empty the transferring receptacle 22, as shown in FIG. 5.

According to this embodiment of the present disclosure, the second high position H21 is arranged to be higher than the first high position H11. In addition, the temporal-retaining high trough 52 of the secondary circulation device 50 is arranged to be close to the second high position H21, and is higher than the loading receptacle 12 in the first high position H11.

Figure 6:
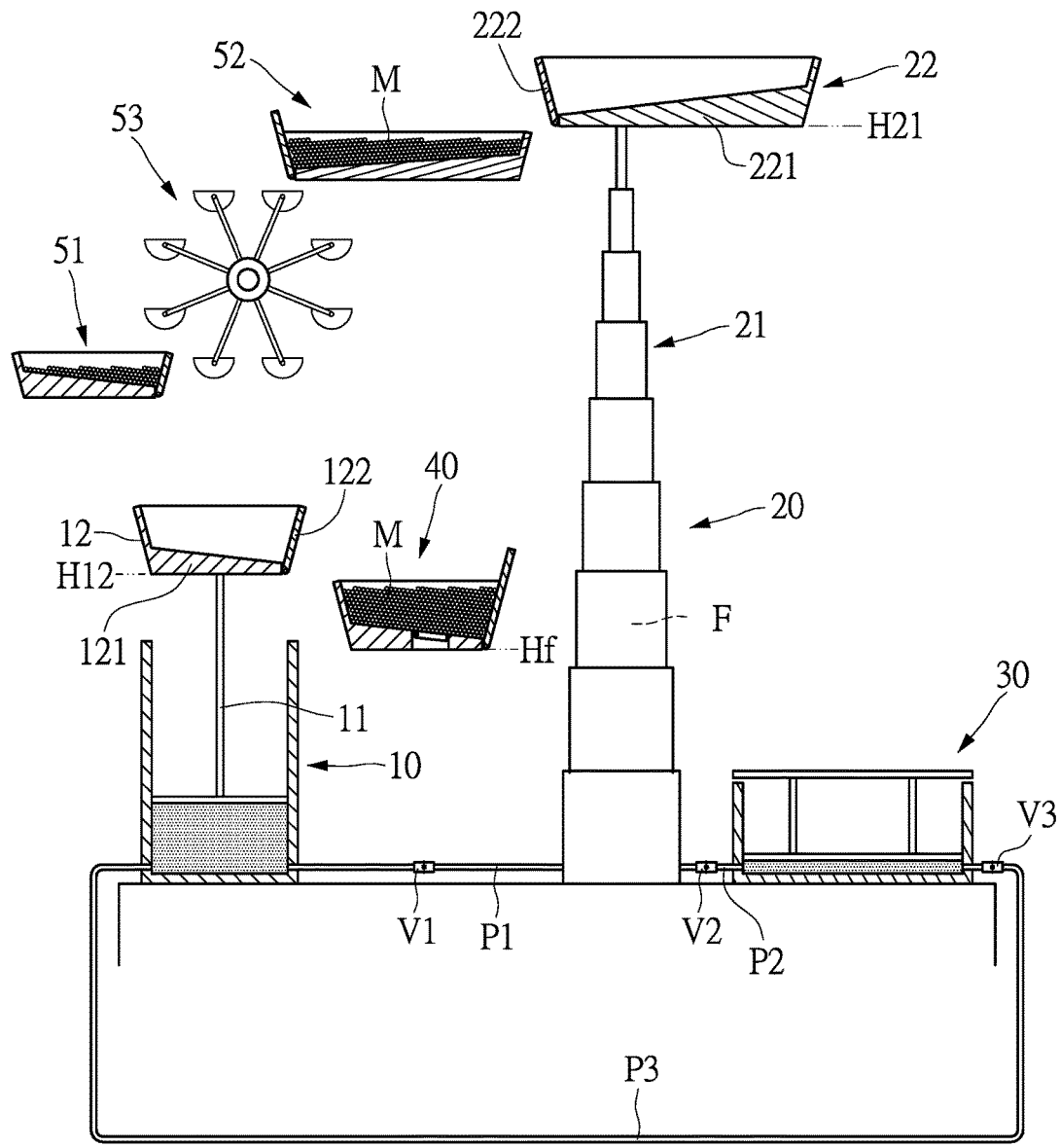
FIG. 6 is a schematic view of an energy-saving hydraulic system having an energy-transformation device of the present invention.
Figure 10:
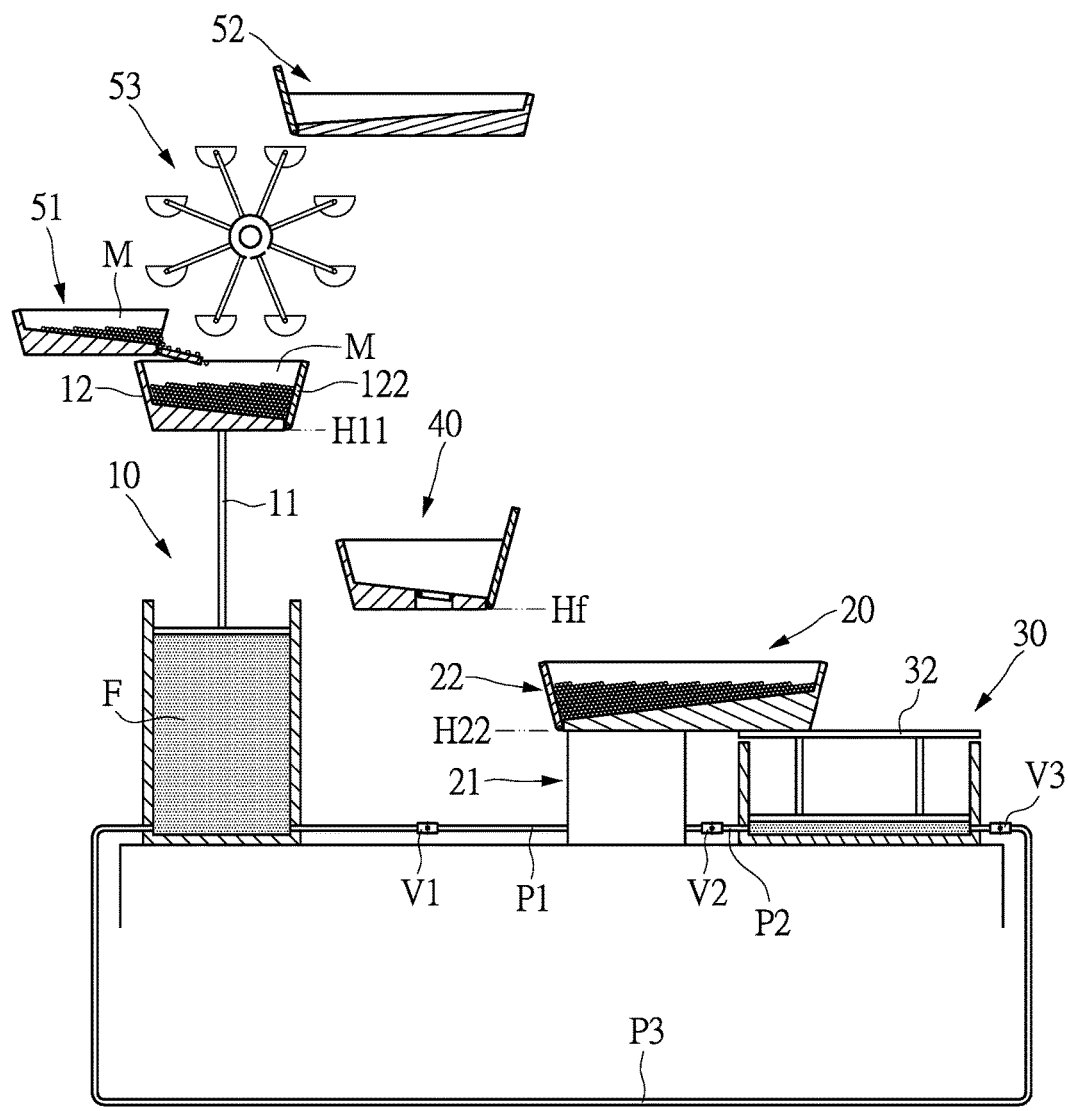
FIG. 10 is a schematic view of an energy-saving hydraulic system being recovered to an initial condition of the present invention.

Refer to FIG. 6. In one practical embodiment according to the present disclosure, the secondary circulation device 50 can further have an energy-transformation device 53, which is close to the temporal-retaining high trough 52, so that the potential energy of the working material M in the temporal-retaining high trough 52 can be transformed into other kinds of energy, such as electricity. As shown in FIG. 6, the energy-transformation device 53 can be an electricity generator like a hydraulic power generator. The working material M is poured into cup-shaped blades (not labeled) of the electricity generator, to force the electricity generator to rotate to generate electric power. Following this, the cup-shaped blades move downward to the position above the material-retaining temporal trough 51. The working material M is poured into the material-retaining temporal trough 51, and is reserved temporarily. As shown in FIG. 10, the working material M then is transferred from the material-retaining temporal trough 51 to the loading receptacle 12. Therefore, the working material M in the transferring receptacle 22 can be transferred downward again into the loading receptacle 12 of the exerting hydraulic device 10. Therefore, the working material M can be used cyclically for environmental protection.

The impetus hydraulic device 20 in this embodiment is just an illustrative example. The impetus hydraulic device 20 can be a hydraulic lifting device, such as a firefighter's tower ladder of a telescopic type or a folding type, which can be coordinated with the arrangement of the present invention, to make the second high position H21 higher than the first high position H11. To transform the potential energy according to the hydraulic strokes, if necessary, the working material M in the transferring receptacle 22 can be less than the working material M in the loading receptacle 12.

Figure 7:
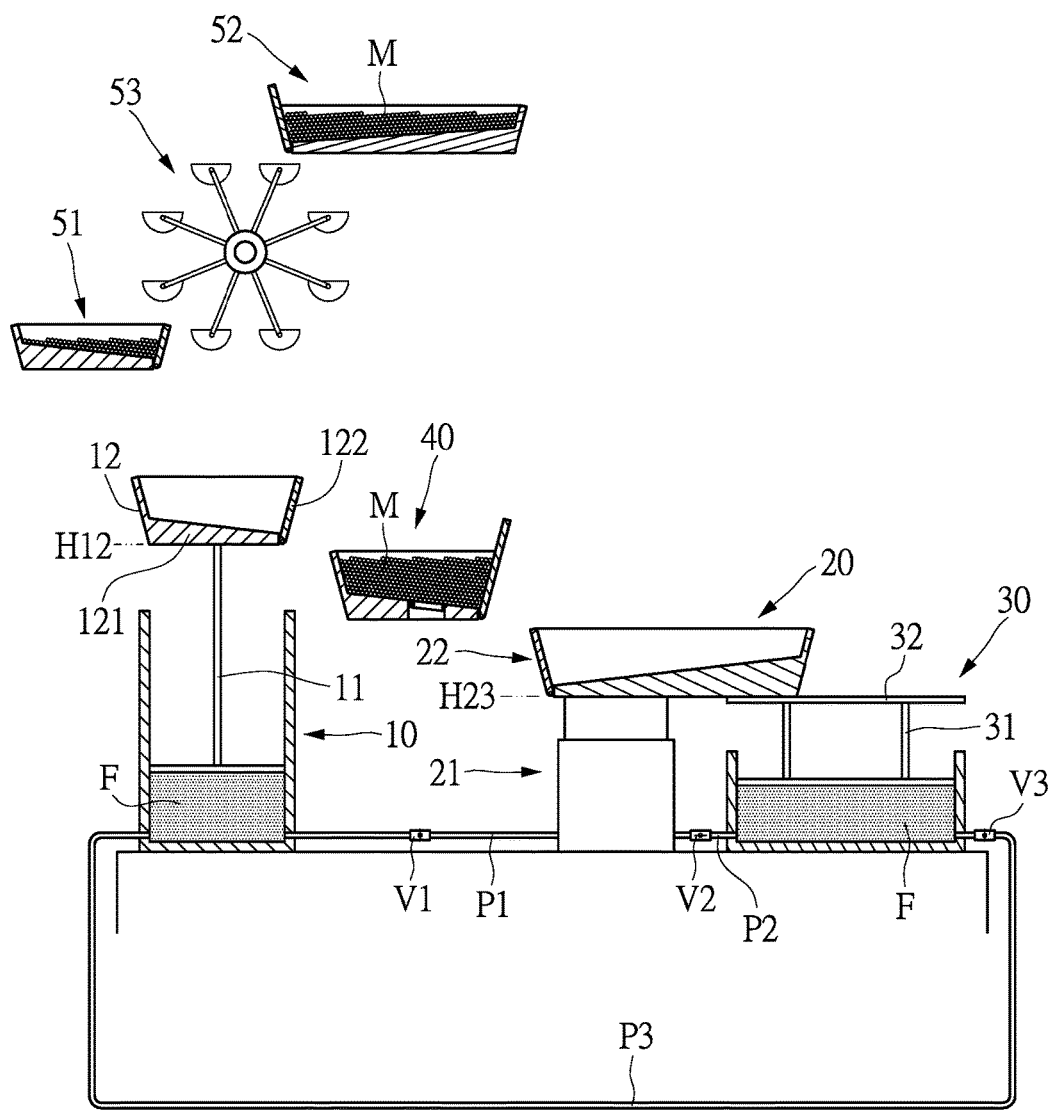
FIG. 7 is a schematic view of an energy-saving hydraulic system lowering the transferring receptacle of the present invention.

Refer to FIG. 7. The following is a reflowing process of hydraulic fluid of the energy-saving hydraulic system of the present invention. After emptying the transferring receptacle 22 of the impetus hydraulic device 20, the control valve V2 of the second pipe P2 is turned on. By gravity, the transferring receptacle 22 is lowered down, and the working fluid F enters into the recovering hydraulic device 30 from the impetus hydraulic device 22 through the second pipe P2. In the meantime, the control valve V3 is turned off, and the working fluid F is restored temporarily in the recovering hydraulic device 30. In addition, the transferring receptacle 22 has one side closed to the buffering receptacle 40, and another side which is extended over the sustaining portion 32. While the impetus hydraulic device 22 is lowering down, the third piston 31 is continuously raised. When the transferring receptacle 22 is lowered to the returning position H23 which is higher than the second low position H22, the third piston 31 lifts the sustaining portion 32 to touch the transferring receptacle 22. After this the working material M is transferred to the transferring receptacle 22, to turn on the control valve V3 of the third pipe P3. In the meantime, the control valve V2 of the second pipe P2 is stilled turned on, and the control valve V1 of the first pipe P1 is still turned off. In this embodiment, a highest level of the sustaining portion 32 can be designed as the returning position H23.

Figure 8:
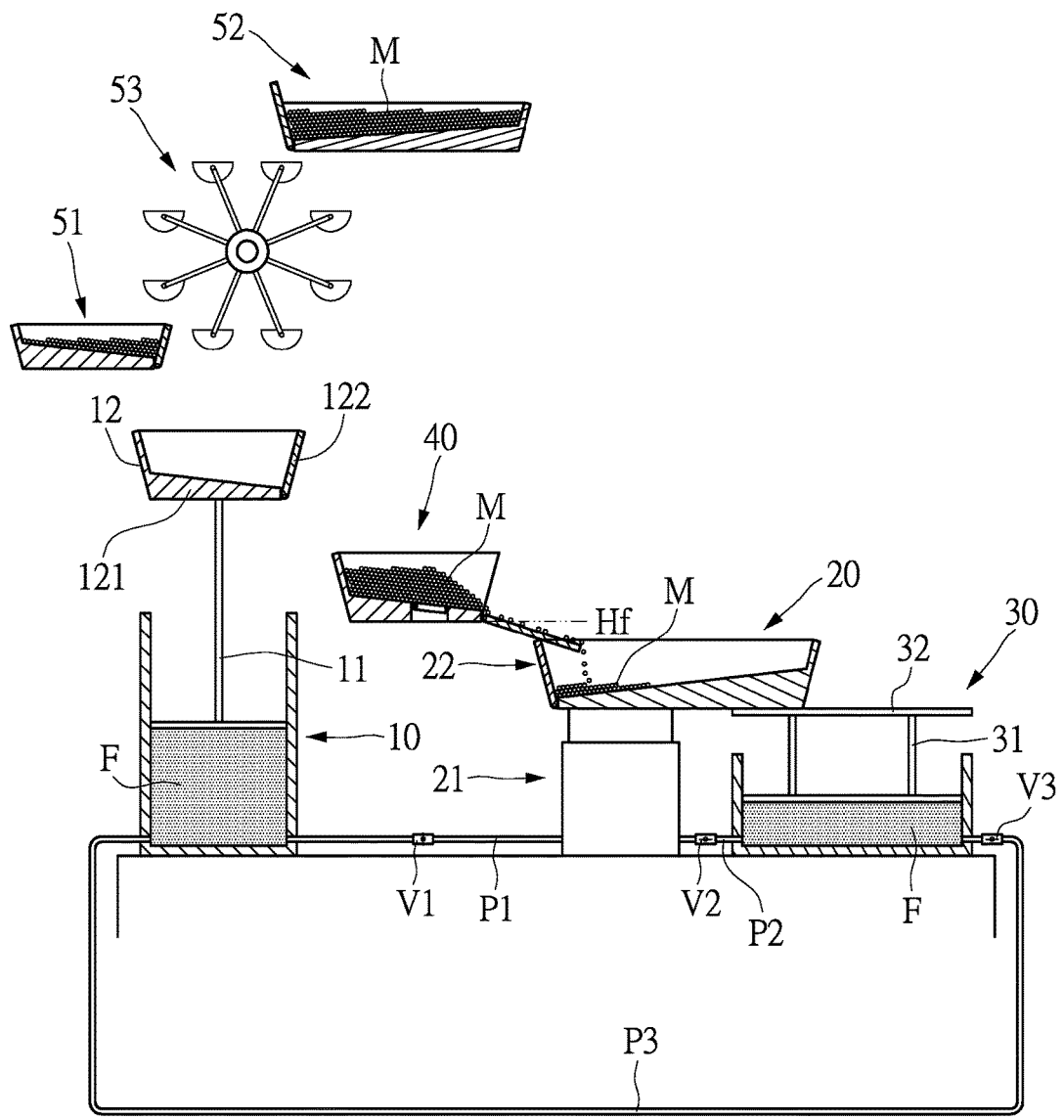
FIG. 8 is a schematic view of an energy-saving hydraulic system using the working material in the buffering receptacle to reflow a working fluid to an exerting hydraulic device of the present invention.
Figure 9:
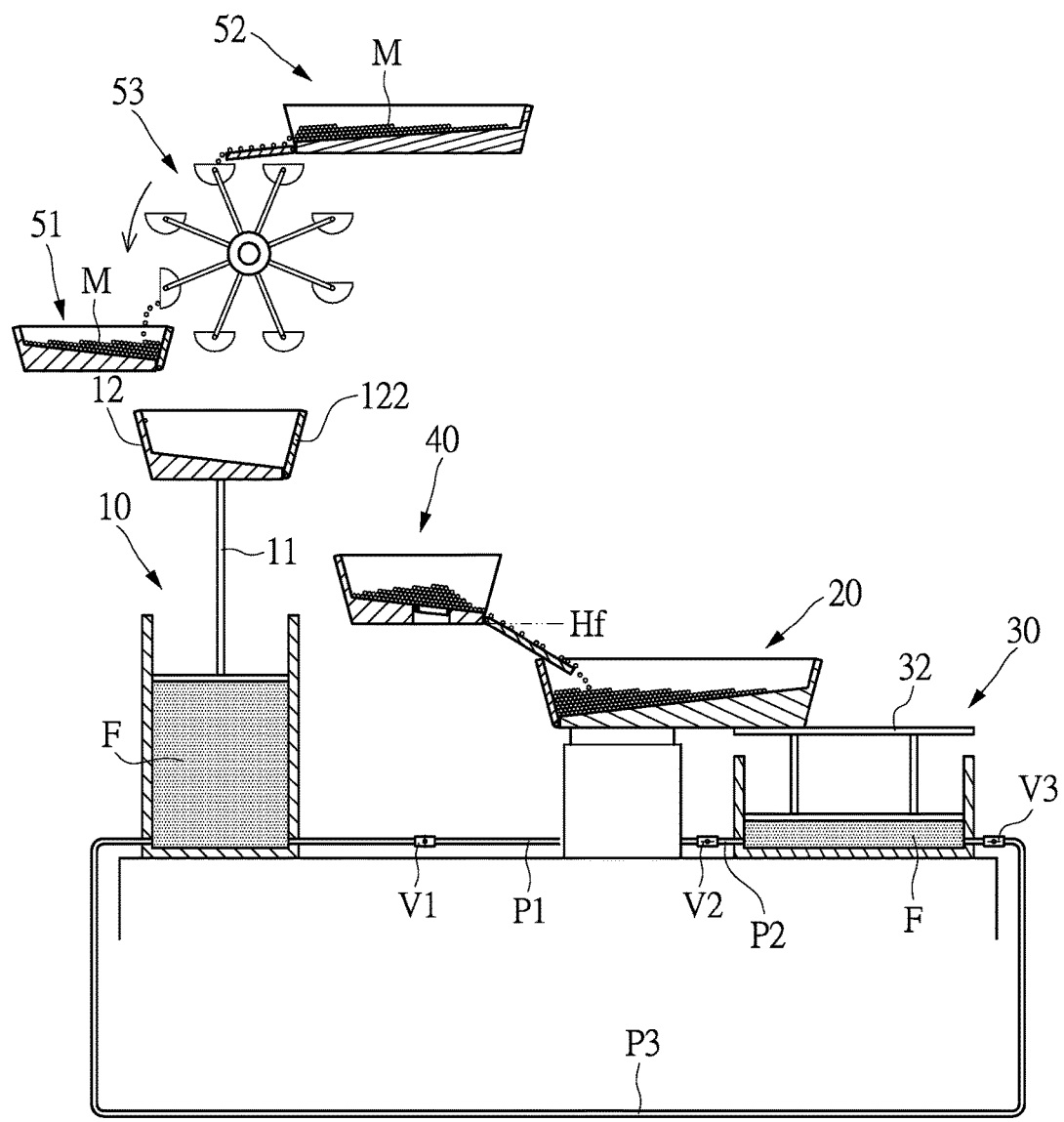
FIG. 9 is a schematic view of an energy-saving hydraulic system driving the energy-transformation device of the present invention.

Refer to FIG. 8. The active gate 42 of the buffering receptacle 40 is turned on, and the working material M in the buffering receptacle 40 is transferred into the transferring receptacle 22. In the meantime, the control valve V3 is turned on. The transferring receptacle 22 is affected by the gravity of the working material M, and is lowering continuously to the second low position H22. The transferring receptacle 22 continuously exerts force to the sustaining portion 32, so that the working fluid F remaining in the recovering hydraulic device 30 is squeezed by the third piston 31 back to the exerting hydraulic device 10. Meanwhile, the loading receptacle 12 is lifted to the first high position H11. In addition, as the transferring receptacle 22 is continuously being lowered down to the second low position H22, the working fluid F remaining in the impetus hydraulic device 20 flows continuously to the recovering hydraulic device 30, and then to the exerting hydraulic device 10. Further, if it is necessary, the bottom gate 43 of the buffering receptacle 40 can be opened, so that the working material M can be removed to cooperate with the impetus hydraulic device 20 for a transformable energy.

As the impetus hydraulic device 20 is lowering from the returning position H23 to the second low position H22, the impetus hydraulic device 20 continuously presses the sustaining portion 32 of the recovering hydraulic device 30, so that the working fluid F (such as hydraulic fluid) is flowing from the recovering hydraulic device 30 to the exerting hydraulic device 10. The loading receptacle 12 moves to the first high position H11 (as shown in FIG. 1).

Second Embodiment

Figure 11:
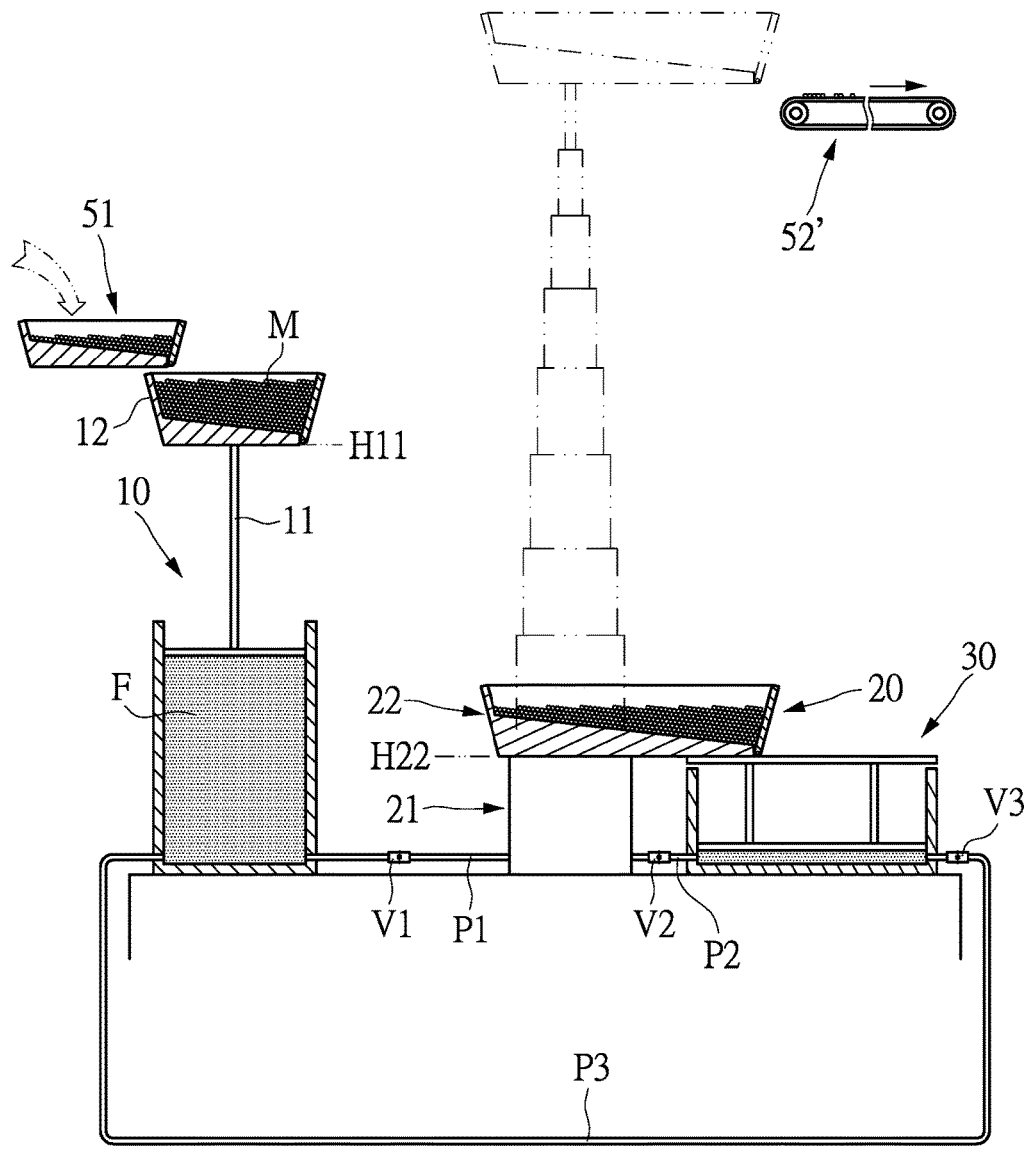
FIG. 11 is a schematic view of an energy-saving hydraulic system of a second embodiment of the present invention.

Refer to FIG. 11, which is a schematic diagram of an energy-saving hydraulic system of second embodiment according to the present invention. The difference between this embodiment and the above-mentioned embodiment is that, this embodiment can omit the buffering receptacle 40. Other elements and operating processes are the same as the first embodiment, and is not reiterated herein for the sake of brevity. Comparing with the first embodiment, as shown in FIG. 11, a distance between the exerting hydraulic device 10 and the impetus hydraulic device 20 is shortened. By controlling the weight difference of working material M in different receptacles, until the transferring receptacle 22 is lower than the loading receptacle 12, and by controlling the control valves V1, V2, V3 like the first embodiment, the working material M in the loading receptacle 12 can be directly transferred into the transferring receptacle 22 of the impetus hydraulic device 20. In addition, the material-retaining temporal trough 51 of this embodiment can be a supplying area of working material. Further, when the working material M is lifted by hydraulic devices, the use of this embodiment can directly transfer the working material M to another place. For example, the working material M can be transferred by a transporting unit 52' as shown in FIG. 11. Compared with a conventional technology, the present disclosure does not waste additional energy, such as electricity, and the working material M can be lifted and utilized well.

To sum up, the hydraulic system of the present disclosure has advantages, such as energy-saving, recyclable, without electricity, so that it can save electricity compared with a traditional conveyer belt. The first high position H11 of the loading receptacle 12 is higher than the buffering receptacle 40, and the buffering receptacle 40 is higher than the transferring receptacle 22 in the second low position H22 of the impetus hydraulic device 20. A potential energy of the height difference of the working material is utilized to drive the hydraulic device, so as to achieve the purpose of energy-efficiency and environmental-friendliness. In addition, the secondary circulation device 50 can be arranged between the transferring receptacle 22 of the impetus hydraulic device 20 and the loading receptacle 12 of the exerting hydraulic device 10. The working material M is transferred downward from the loading receptacle 12 of the exerting hydraulic device 10, may go through the buffering receptacle 40, and be lifted by the transferring receptacle 22 of the impetus hydraulic device 20. The working material M can be transferred into the temporal-retaining high trough 52 of the secondary circulation device 50, and finally back to the loading receptacle 12. The working material M again can be transferred into the transferring receptacle 22 of the impetus hydraulic device 20, so as to have the advantage of recycling the working material.

Moreover, when the impetus hydraulic device 20 is lowered downward from the returning position H23 to the second low position H22, the transferring receptacle 22 contacts and presses the sustaining portion 32 of the recovering hydraulic device 30. Thus, the working fluid F flows from the recovering hydraulic device 20 back to the exerting hydraulic device 10. The loading receptacle 12 comes back to the first high position H11 to wait for the next time of supplying the working material. This present invention can transfuse the working fluid F back to the exerting hydraulic device 10, without using other energy, so as to have effectiveness of energy-efficiency and environmental-friendliness.

The hydraulic system of the present disclosure utilizes the potential difference of the working material to drive a plurality of hydraulic devices, so as to transfer another batch of working material upward. The working material can fall to the original position without any other power source, to provide an energy-efficiency of cycling usage.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. An energy-saving hydraulic system, comprising:
   an exerting hydraulic device, including a loading receptacle, the loading receptacle selectively arranged in a first high position or a first low position;
   an impetus hydraulic device, connecting to the exerting hydraulic device by a first pipe, wherein the impetus hydraulic device includes a transferring receptacle, the transferring receptacle is selectively arranged in a second high position, a returning position, or a second low position lower than the returning position; wherein when the loading receptacle is lowered to the first low position, a working fluid in the exerting hydraulic device flowing to the impetus hydraulic device, so as to lift the transferring receptacle to the second high position; and
   a recovering hydraulic device, connected to the impetus hydraulic device by a second pipe, and connected to the exerting hydraulic device by having a third pipe, wherein the recovering hydraulic device includes a liftable sustaining portion; wherein when the transferring receptacle of the impetus hydraulic device is lowered from the second high position to the returning position, the transferring receptacle contacts the sustaining portion; when the transferring receptacle is continuously lowered to the second low position, the transferring receptacle presses the sustaining portion to urge the working fluid to flow from the recovering hydraulic device back to the exerting hydraulic device.

2. The energy-saving hydraulic system as claimed in claim 1, wherein the second high position is higher than the first high position.

3. The energy-saving hydraulic system as claimed in claim 1, further comprising a buffering receptacle disposed at one side of the exerting hydraulic device, and in a position lower than the first low position; wherein the second low position of the transferring receptacle is lower than a position of the buffering receptacle;
   wherein the loading receptacle has a slanted bottom-surface slanting toward the buffering receptacle, and an active gate facing the buffering receptacle.

4. The energy-saving hydraulic system as claimed in claim 3, wherein the buffering receptacle has a bottom gate.

5. The energy-saving hydraulic system as claimed in claim 3, wherein the transferring receptacle has one side closed to the buffering receptacle, and another side extended over the sustaining portion.

6. The energy-saving hydraulic system as claimed in claim 1, further comprising a secondary circulation device arranged between the transferring receptacle of the impetus hydraulic device and the loading receptacle of the exerting hydraulic device.

7. The energy-saving hydraulic system as claimed in claim 6, wherein the secondary circulation device further includes a temporal-retaining high trough, the temporal-retaining high trough being fixed in a position lower than the second high position; when the transferring receptacle is moved to the second high position, the temporal-retaining high trough is close to the transferring receptacle.

8. The energy-saving hydraulic system as claimed in claim 7, wherein the secondary circulation device further has an energy-transformation device close to the temporal-retaining high trough, so as to transform a potential energy of the working material in the temporal-retaining high trough into other kinds of energy.

9. The energy-saving hydraulic system as claimed in claim 1, further comprising a material-retaining temporal trough, the material-retaining temporal trough arranged to a position higher than that of the first high position, so as to receive the working material.

10. The memory card connector as claimed in claim 1, wherein the first pipe, the second pipe and the third pipe respectively has at least one control valve.

* * * * *